United States Patent
Yao et al.

(10) Patent No.: US 8,611,671 B2
(45) Date of Patent: Dec. 17, 2013

(54) THIN LINE DETECTION AND ENHANCEMENT FOR ELECTRONIC IMAGES HAVING DIFFERENT RESOLUTIONS

(75) Inventors: Meng Yao, West Linn, OR (US); Xing Li, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 630 days.

(21) Appl. No.: 12/841,663

(22) Filed: Jul. 22, 2010

(65) Prior Publication Data

US 2012/0020570 A1 Jan. 26, 2012

(51) Int. Cl.
*G06K 9/46* (2006.01)

(52) U.S. Cl.
USPC ........................................ 382/203

(58) Field of Classification Search
USPC .................. 382/176, 203, 261; 358/3.27
See application file for complete search history.

(56) References Cited

U.S. PATENT DOCUMENTS

| | | | |
|---|---|---|---|
| 2003/0030824 A1* | 2/2003 | Ogasahara et al. | 358/1.8 |
| 2004/0012815 A1* | 1/2004 | Fuchigami | 358/2.1 |
| 2006/0007497 A1* | 1/2006 | Yokochi | 358/3.27 |
| 2007/0127847 A1* | 6/2007 | Aoki et al. | 382/298 |

FOREIGN PATENT DOCUMENTS

JP 10-271380 * 10/1998

* cited by examiner

*Primary Examiner* — Amara Abdi
(74) *Attorney, Agent, or Firm* — Pillsbury Winthrop Shaw Pittman LLP

(57) ABSTRACT

A methodology for thin line detection and enhancement in electronic images is disclosed. The methodology includes associating an electronic image with at least one basic context window that is less than the size of the electronic image based on the input image resolution of the electronic image; detecting one or more predefined patterns which correspond to thin lines in the electronic image using the at least one basic context window; excluding patterns for the one or more detected patterns which are halftone patterns; and adding at least one pixel to the electronic image based on at least one of the remaining patterns so as to enhance thin line features in the electronic image. In some implementation, the methodology may be configured to handle electronic images having different resolutions. A system for thin line detection and enhancement in electronic images having different resolutions is also disclosed.

26 Claims, 15 Drawing Sheets

200a

| t4 | t3 | t2 |
|----|----|----|
| m4 | m3 | m2 |
| b4 | b3 | b2 |

| t4 | t3 | t2 |    |    |
|----|----|----|----|----|
| m4 | m3 | m2 | m1 | m0 |
| b4 | b3 | b2 |    |    |

FIG. 2B

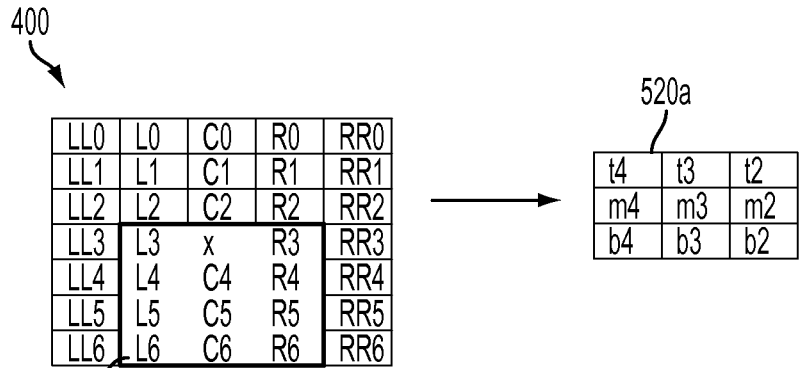
FIG. 4
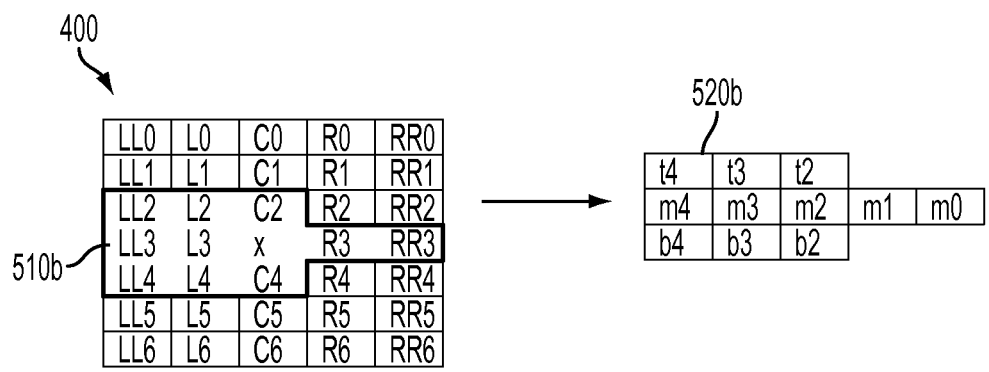
FIG. 5A
FIG. 5B

| LL0 | L0 | C0 | R0 | RR0 |
|-----|----|----|----|-----|
| LL1 | L1 | C1 | R1 | RR1 |
| LL2 | L2 | C2 | R2 | RR2 |
| LL3 | L3 | x  | R3 | RR3 |
| LL4 | L4 | C4 | R4 | RR4 |
| LL5 | L5 | C5 | R5 | RR5 |
| LL6 | L6 | C6 | R6 | RR6 |

FIG. 6A

| LL0 | L0 | C0 | R0 | RR0 |
|-----|----|----|----|-----|
| LL1 | L1 | C1 | R1 | RR1 |
| LL2 | L2 | C2 | R2 | RR2 |
| LL3 | L3 | x  | R3 | RR3 |
| LL4 | L4 | C4 | R4 | RR4 |
| LL5 | L5 | C5 | R5 | RR5 |
| LL6 | L6 | C6 | R6 | RR6 |

FIG. 6B

| LL0 | L0 | C0 | R0 | RR0 |
|-----|----|----|----|-----|
| LL1 | L1 | C1 | R1 | RR1 |
| LL2 | L2 | C2 | R2 | RR2 |
| LL3 | L3 | x  | R3 | RR3 |
| LL4 | L4 | C4 | R4 | RR4 |
| LL5 | L5 | C5 | R5 | RR5 |
| LL6 | L6 | C6 | R6 | RR6 |

FIG. 6C

| LL0 | L0 | C0 | R0 | RR0 |
|-----|----|----|----|-----|
| LL1 | L1 | C1 | R1 | RR1 |
| LL2 | L2 | C2 | R2 | RR2 |
| LL3 | L3 | x  | R3 | RR3 |
| LL4 | L4 | C4 | R4 | RR4 |
| LL5 | L5 | C5 | R5 | RR5 |
| LL6 | L6 | C6 | R6 | RR6 |

FIG. 6D

| LL0 | L0 | C0 | R0 | RR0 |
|-----|----|----|----|-----|
| LL1 | L1 | C1 | R1 | RR1 |
| LL2 | L2 | C2 | R2 | RR2 |
| LL3 | L3 | x  | R3 | RR3 |
| LL4 | L4 | C4 | R4 | RR4 |
| LL5 | L5 | C5 | R5 | RR5 |
| LL6 | L6 | C6 | R6 | RR6 |

FIG. 6E

| LL0 | L0 | C0 | R0 | RR0 |
|-----|----|----|----|-----|
| LL1 | L1 | C1 | R1 | RR1 |
| LL2 | L2 | C2 | R2 | RR2 |
| LL3 | L3 | x  | R3 | RR3 |
| LL4 | L4 | C4 | R4 | RR4 |
| LL5 | L5 | C5 | R5 | RR5 |
| LL6 | L6 | C6 | R6 | RR6 |

| LL0 | L0 | C0 | R0 | RR0 |
|-----|----|----|----|----|
| LL1 | L1 | C1 | R1 | RR1 |
| LL2 | L2 | C2 | R2 | RR2 |
| LL3 | L3 | x  | R3 | RR3 |
| LL4 | L4 | C4 | R4 | RR4 |
| LL5 | L5 | C5 | R5 | RR5 |
| LL6 | L6 | C6 | R6 | RR6 |

FIG. 7B

| LL0 | L0 | C0 | R0 | RR0 |
|-----|----|----|----|----|
| LL1 | L1 | C1 | R1 | RR1 |
| LL2 | L2 | C2 | R2 | RR2 |
| LL3 | L3 | x  | R3 | RR3 |
| LL4 | L4 | C4 | R4 | RR4 |
| LL5 | L5 | C5 | R5 | RR5 |
| LL6 | L6 | C6 | R6 | RR6 |

FIG. 7C

| LL0 | L0 | C0 | R0 | RR0 |
|-----|----|----|----|----|
| LL1 | L1 | C1 | R1 | RR1 |
| LL2 | L2 | C2 | R2 | RR2 |
| LL3 | L3 | x  | R3 | RR3 |
| LL4 | L4 | C4 | R4 | RR4 |
| LL5 | L5 | C5 | R5 | RR5 |
| LL6 | L6 | C6 | R6 | RR6 |

FIG. 7D

| LL0 | L0 | C0 | R0 | RR0 |
|-----|----|----|----|-----|
| LL1 | L1 | C1 | R1 | RR1 |
| LL2 | L2 | C2 | R2 | RR2 |
| LL3 | L3 | x  | R3 | RR3 |
| LL4 | L4 | C4 | R4 | RR4 |
| LL5 | L5 | C5 | R5 | RR5 |
| LL6 | L6 | C6 | R6 | RR6 |

FIG. 7E

| LL0 | L0 | C0 | R0 | RR0 |
|-----|----|----|----|-----|
| LL1 | L1 | C1 | R1 | RR1 |
| LL2 | L2 | C2 | R2 | RR2 |
| LL3 | L3 | x  | R3 | RR3 |
| LL4 | L4 | C4 | R4 | RR4 |
| LL5 | L5 | C5 | R5 | RR5 |
| LL6 | L6 | C6 | R6 | RR6 |

FIG. 7F

| LL0 | L0 | C0 | R0 | RR0 |
|-----|----|----|----|-----|
| LL1 | L1 | C1 | R1 | RR1 |
| LL2 | L2 | C2 | R2 | RR2 |
| LL3 | L3 | x  | R3 | RR3 |
| LL4 | L4 | C4 | R4 | RR4 |
| LL5 | L5 | C5 | R5 | RR5 |
| LL6 | L6 | C6 | R6 | RR6 |

FIG. 7G

| LL0 | L0 | C0 | R0 | RR0 |
|-----|----|----|----|-----|
| LL1 | L1 | C1 | R1 | RR1 |
| LL2 | L2 | C2 | R2 | RR2 |
| LL3 | L3 | x  | R3 | RR3 |
| LL4 | L4 | C4 | R4 | RR4 |
| LL5 | L5 | C5 | R5 | RR5 |
| LL6 | L6 | C6 | R6 | RR6 |

FIG. 7H

ORIGINAL 600 X 600 DPI PRINTING

1200 X 1200 DPI PRINTING WITHOUT
THIN LINE ENHANCEMENT

1200 X 1200 DPI PRINTING WITH
THIN LINE ENHANCEMENT

1010a

| LL0 | L0 | C0 | R0 | RR0 |
|-----|----|----|----|-----|
| LL1 | L1 | C1 | R1 | RR1 |
| LL2 | L2 | C2 | R2 | RR2 |
| LL3 | L3 | x  | R3 | RR3 |
| LL4 | L4 | C4 | R4 | RR4 |
| LL5 | L5 | C5 | R5 | RR5 |

| LL0 | L0 | C0 | R0 | RR0 |
|-----|----|----|----|-----|
| LL1 | L1 | C1 | R1 | RR1 |
| LL2 | L2 | C2 | R2 | RR2 |
| LL3 | L3 | x  | R3 | RR3 |
| LL4 | L4 | C4 | R4 | RR4 |
| LL5 | L5 | C5 | R5 | RR5 |

FIG. 10B

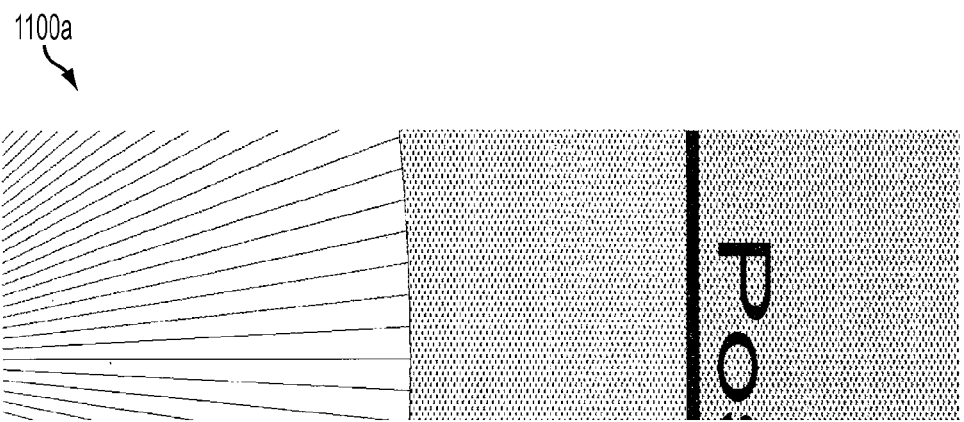
FIG. 11A — BITMAP WITHOUT THIN LINE ENHANCEMENT
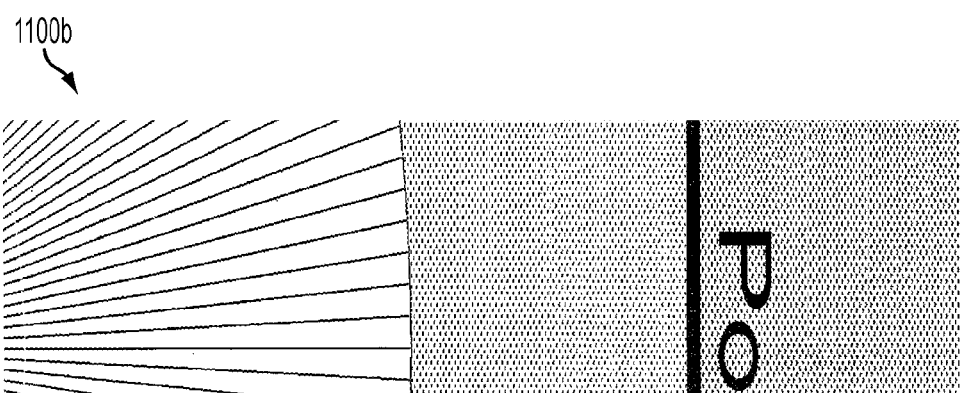
FIG. 11B — BITMAP WITH THIN LINE ENHANCEMENT

THIN LINE DETECTION AND ENHANCEMENT FOR ELECTRONIC IMAGES HAVING DIFFERENT RESOLUTIONS

FIELD

This application generally relates to digital image processing, and in particular to, thin line detection and enhancement for electronic images having different resolutions.

BACKGROUND

High resolution printing offers many image quality advantages. However, many marking engines have trouble processing thin lines in high resolution images for printing. While detection and enhancement of single pixel lines is often adequate in handling input resolutions of 1200×1200 and lower, for printers that offer higher resolutions there is no effective way to detect and enhance single pixel lines as well as lines that are more than one pixel wide.

SUMMARY

According to one embodiment of this disclosure, a method for thin line detection and enhancement in electronic images comprises: associating an electronic image with at least one basic context window that is less than the size of the electronic image based on the input image resolution of the electronic image; detecting one or more predefined patterns which correspond to thin lines in the electronic image using the at least one basic context window; excluding patterns for the one or more detected patterns which are halftone patterns; and adding at least one pixel to the electronic image based on at least one of the remaining patterns so as to enhance thin line features in the electronic image.

According to another embodiment of this disclosure, a system for thin line enhancement in electronic images comprises: an image processor configured to: associate an electronic image with at least one basic context window that is less than the size of the electronic image based on the input image resolution of the electronic image; detect one or more predefined patterns which correspond to thin lines in the electronic image using the at least one basic context window; exclude patterns for the one or more detected patterns which are halftone patterns; and add at least one pixel to the electronic image based on at least one of the remaining patterns so as to enhance thin line features in the electronic image.

Other features of one or more embodiments of this disclosure will seem apparent from the following detailed description, and accompanying drawings, and the appended claims.

BRIEF DESCRIPTION OF THE DRAWINGS

Embodiments of the present disclosure will now be disclosed, by way of example only, with reference to the accompanying schematic drawings in which corresponding reference symbols indicate corresponding parts, in which:

FIGS. 2A and 2B show exemplary basic context windows which may be used for horizontal and vertical thin line detection, respectively, according to embodiments.

FIG. 4 shows an exemplary larger context window that may be used for handling thin line detection in images having different input resolutions according to an embodiment.

FIG. 5A shows converting a larger context window to the smaller basic context window in preparing for horizontal thin line detection and enhancement according to an embodiment. FIG. 5B shows converting a smaller basic context window in preparing for vertical thin line detection and enhancement according to an embodiment.

Figures 6G, 6H, 7A:
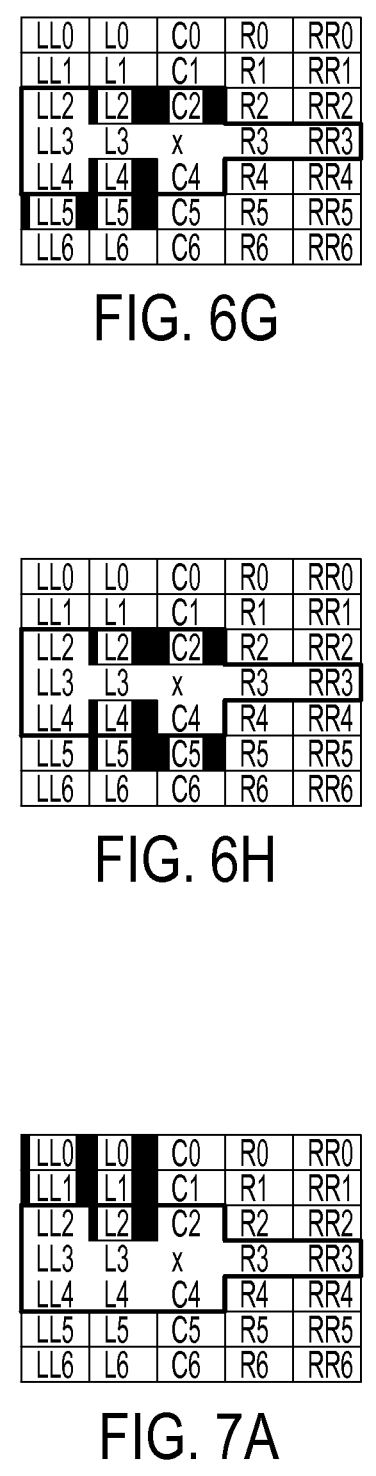

FIGS. 6A-6H show various exclusion patterns which may be used with an initialExclusion option enabled according to an embodiment.

FIG. 7A-H show various exclusion patterns which may be used with a moreExclusions option enabled according to an embodiment.

FIGS. 10A and 10B shows two other patterns in accordance with an embodiment.

FIGS. 11A and 11B show images with and without thin line growth respectively, according to embodiments.

DETAILED DESCRIPTION

Figure 1A:
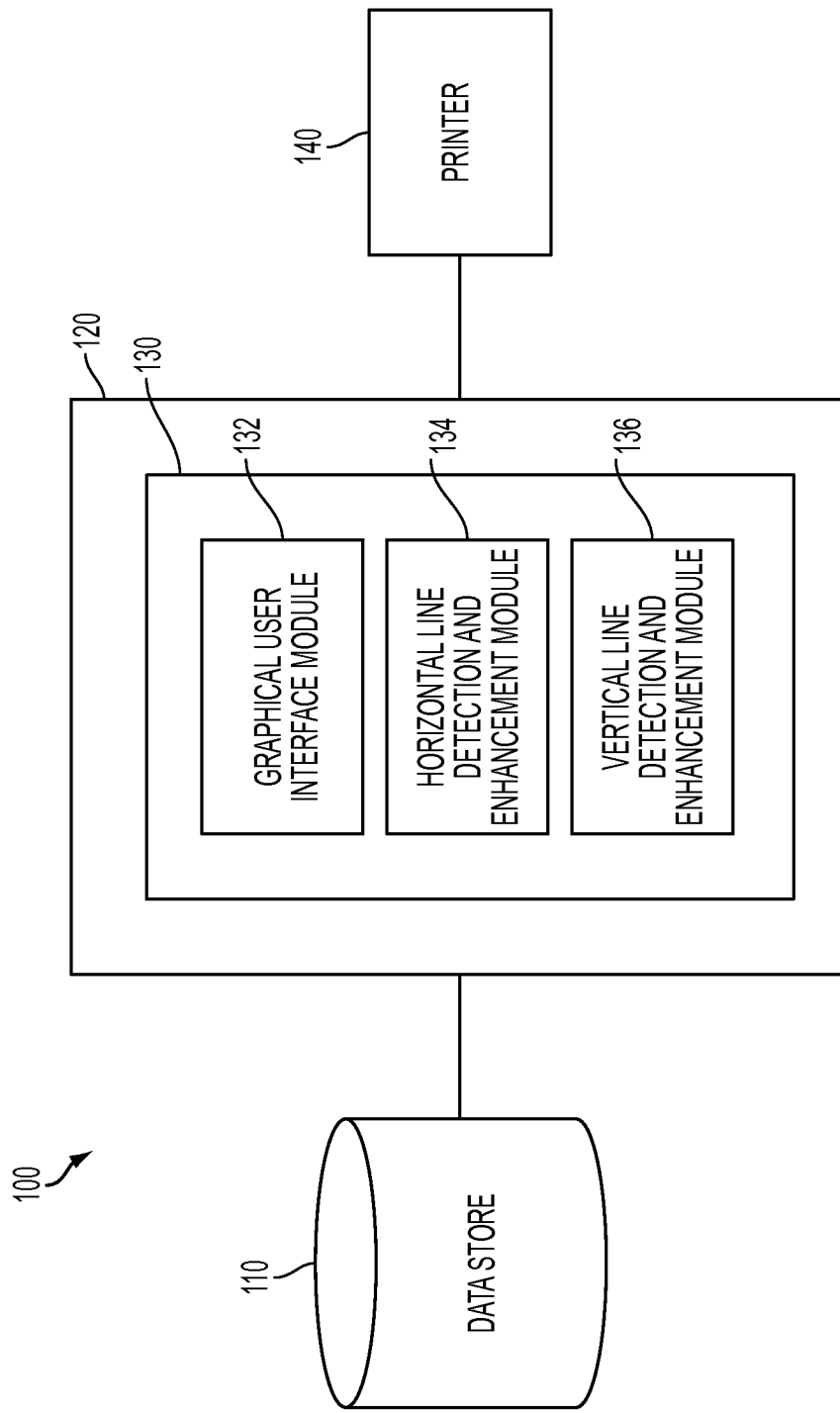
FIG. 1A shows an exemplary architecture for thin line detection and enhancement system according to an embodiment.

According to an aspect of this disclosure, a methodology is disclosed in which inferential processing on a small binary context window can be used to detect candidate scenarios which likely include features characteristic of horizontal and/or vertical lines for electronic images.

Slanted or angled lines may be handled by performing both horizontal and vertical detection. The methodology may then exclude or disqualify one or more scenarios that were previously detected as candidates for enhancement based on pattern matching using a larger binary context window. As such, potential halftone patterns, which are not thin lines, may not be accidentally enhanced. From the remaining patterns, at least one pixel may be added to the detected thin lines for enhancement thereof.

This processing may support electronic documents having various input image resolutions, such as, for example, 600, 1200 and 2400 dots-per-inch (dpi) and combinations thereof in both the horizontal and vertical directions (e.g., 1200×600 dpi, 1200×1200 dpi, or 1200×2400 dpi). Although, the methodology may be applied to devices which can only handle one resolution, such as, for example, 1200×2400 dpi.

According to an embodiment, input electronic images having different resolutions may be handled by the same basic logic detection scheme, which may be implemented by a common image processor or circuit. The basic logic detection scheme using one or more basic context windows may be configured to handle input electronic images having an input resolution, for example, of 1200 dpi.

Larger resolution input electronic images, such as, for example, of 2400 dpi, may be initially handled using one or more larger context which are then mapped to the one or more basic context windows. Using the same basic context windows for electronic images having different input resolutions allows a relatively modest image processor to perform detection and correction thereby minimizing processing resources, such as, gate counts in a circuit.

The embodiments disclosed herein may be beneficial for detecting single pixel lines in the electronic image as well as lines which are more than one pixel in width.

As used herein, "electronic image" means any electronic media content that is intended to be used in an electronic form or transmitted to a marking engine to be printed. Exemplary electronic image file types may include various digital images, text, and mixed content files, such as PDF, TXT, DOC, TIFF, BMP, GIF, JPEG, and other common page description language (PDL) file and document formats, such as Adobe® Postscript®. Pixels in the electronic document may be formatted, in some instances, as binary image data. Binary image data is single bit or bi-level, with only two possible values. More particularly, pixel values may be either ON (e.g., value=1) denoting an active pixel, or OFF (e.g., value=0) denoting background.

In addition, as used herein, a "thin line" means a generally contiguous procession of pixels having a width of about two pixels or less, depending on the resolution. For example, at 1200 dpi, a one pixel wide line may be considered a thin line, and at 2400 dpi, a two pixel wide line may be considered a thin line. Lines may be linear, and oriented horizontally, vertically, or slanted (or angled) with respect to a print media. Although it should be appreciated that in some instances, thin lines may be curved or free flowing. There is no specific limit on the length of the lines.

FIG. 1A shows an exemplary architecture 100 for a thin line detection and enhancement system according to an embodiment.

The system architecture 100 may include an electronic data store 110, a processor 120 configured to run an application 130 and an optional printer 140. While the data store 110 and the printer 140 are shown connected directly to processor 120, it will be appreciated that one or both of the data store 110 and the printer 140 may be connected to the processor 120, via one or more networks (not shown). These networks may include wired and/or wireless networks, for instance, the Internet, an intranet, wide area network (WAN), local area network (LAN), etc, or combinations thereof.

Data store 110 may include memory which is configured to store one or more electronic images. Memory may include, for example, any electronic memory device (e.g., flash memory, EEPROM, etc.) or other memory device (e.g., disk drive, writable optical disk, etc.) for storing electronic image data.

The processor 120 may include dedicated hardware, such as, for example, an application specific integrated circuit (ASIC) or field programmable gate array (FPGA), software (and/or firmware), or a combination of dedicated hardware and software. The processor 120 may be incorporated into a computer or other computing device.

The application 130 may include a plurality of modules, including but not limited to, a graphical user interface module 132, horizontal line detection and enhancement module 134, and vertical line detection and enhancement module 136. One or more of the modules comprising application 130 may be combined. For some purposes, not all modules may be necessary.

As software, for instance, the application 130 may be stored on a computer- or machine-readable storage media having computer or machine-executable instructions executable by one or more processors. In one implementation, the application 130 may reside on a memory of a print controller of a printing system or the printing system of another device such as, for instance, a facsimile machine or multifunctional device.

Of course, it will be appreciated that any number of hardware and/or software implementations, programming languages, and operating platforms may be used. As such, the description or recitation of any specific hardware and/or software implementation, programming language, and operating platform herein is exemplary only and should not be viewed as limiting. For the different applications 130 of the embodiments disclosed herein, the programming and/or configuration may vary.

Alternatively or additionally, the application 130 may be a stand-alone application running on a computer which interfaces with a printing system, for example, through a remote network connection, or via a computer readable storage media (i.e., flash memory, DVD/CD ROM, floppy disk, removable or permanent hard drive etc.). In some implementations, the application 130 may be a "plug-in" application that is incorporated into a third-party software application including, for example, document-processing or image production applications. Other configurations may also be implemented.

The graphical user interface (GUI) module 132 is configured to generate a graphical user interface on a display device and to control the various display and input/output (I/O) features of the application. The GUI module 132 may generate display signals to the display device. In one implementation, it may provide one or more "windows" or panes for displaying information to the user. The display device may include a cathode ray tube (CRT), liquid crystal display (LCD), plasma, or other display device. In some implementations, the display device may be incorporated into a printing device, facsimile machine, multifunctional device, or other device.

Moreover, the GUI module 132 allows the user to interact with the application 130). For example, the GUI module 132 may permit use and operation of one or more of: a keyboard, keypad, touch-screen, mouse, joystick, light pen, or other peripheral device for receiving inputs from a user. Similarly, the application may output information and data to the user, for example, via a printer, facsimile machine, multifunctional device or other peripheral device (e.g., external storage device or networked device).

Horizontal thin line detection and enhancement module 134 may be configured to detect one or more horizontal thin lines in the image, as described herein. Once detected, the horizontal thin lines may be enhanced.

Vertical thin line detection and enhancement module 136 may be configured to detect one or more vertical thin lines in the image, as described herein. Once detected, the vertical thin lines may be enhanced.

Printer 140 may include one or more printing or marking engines configured to print electronic images, with or without thin line enhancement. The marking engines may be configured for various printing technologies, such as, for example, xerographic, ink-jet (bubble jet), laser, offset, solid-ink, dye sublimation, or the like. Of course, these printing technologies are merely exemplary and others may similarly be used.

Figure 1B:
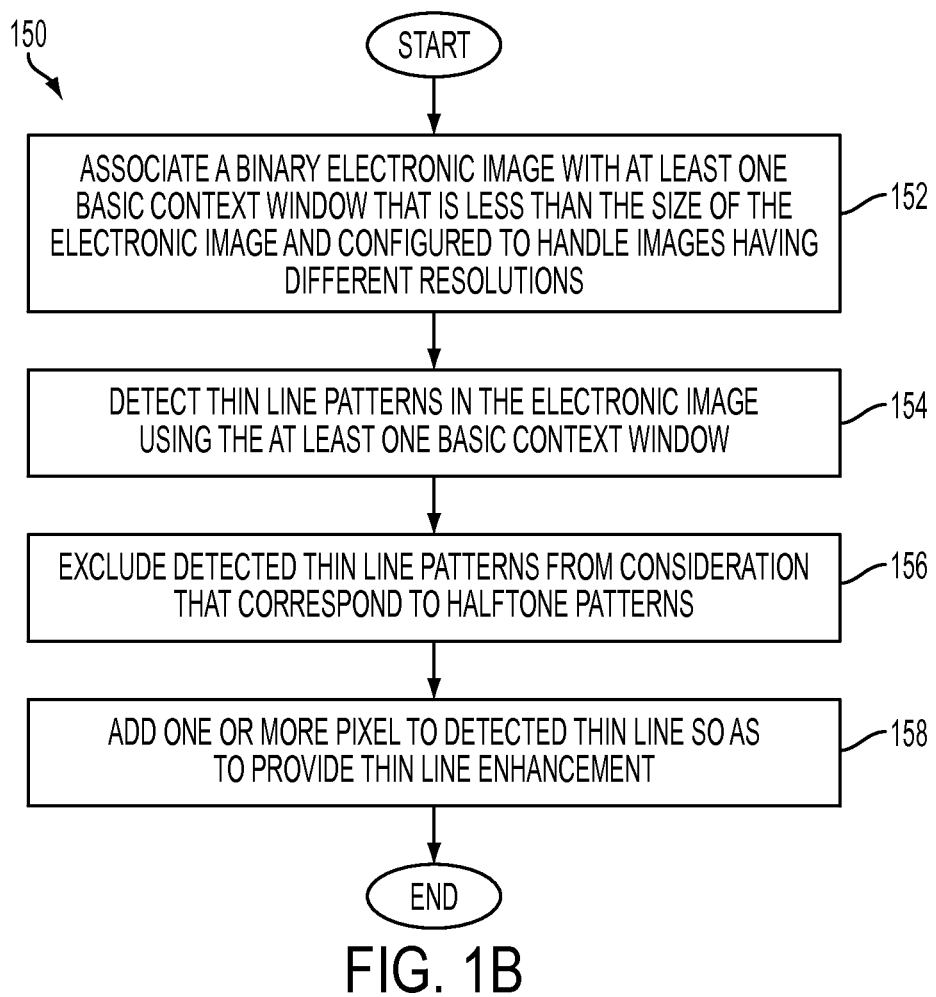
FIG. 1B shows an exemplary methodology for thin line detection and enhancement according to an embodiment.

FIG. 1B shows an exemplary methodology 150 for thin line detection and enhancement which can be used by the horizontal thin line detection and enhancement module 134 and/or the vertical thin line detection and enhancement module 136 according to an embodiment.

In step 152, the methodology 150 for thin line detection and enhancement first associates an electronic image with at least one basic context window that is less than the size of the electronic image. The context windows are used by the processor 120 to process one or more pixels in the electronic images. Generally the context window will be less than the size of the electronic image. For example, the context widow may be an array of pixels in the electronic image which is temporarily stored in memory for consideration. This minimizes the processing and/or memory resources by handling a smaller subset of pixels of the electronic image rather than the whole image.

The at least one basic context window is/are configured to handle electronic images having different input image resolutions. For example, for an input resolution of 1200×600 dpi, pixel values from the electronic image can be directly populated into the at least one basic context window for detecting the one or more predefined patterns in step 154 which correspond to thin lines in the electronic image.

For an input resolution of 1200×2400 dpi, for example, pixel values from the electronic image are first populated into at least one other context window larger than the at least one basic context window; and then the at least one other context window is "collapsed" or mapped to the at least one basic context window for detecting the one or more predefined patterns in step 154 which correspond to thin lines in the electronic image. One reason for having a larger context window is that with higher resolution input it may not be reliably determined if the bit pattern belongs to thin line area or halftone area.

Next, in step 154, input line patterns may be analyzed using a common core detection logic which is adapted for handling electronic images of various input resolutions. This step may comprise two sub-steps: horizontal thin line detection and vertical thin line detection. Slanted or angled thin lines may be handled by both line detection sub-steps. The horizontal and vertical thin line detection may use the same or a separate basic detection window to detect line patterns.

In step 156, one or more detected thin line patterns may be excluded which correspond to halftone patterns. This is to ensure that halftone patterns are not accidentally enhanced. And, in step 158, one or more pixels may be added to the remaining candidates to enhance detected thin line patterns. The methodology 150 may be repeated, as necessary, for the entire electronic image and additional electronic images.

FIGS. 2A and 2B show basic exemplary context windows which may be used for horizontal and vertical thin line detection, respectively, according to embodiments.

The basic context windows may be configured to handle input electronic images having an input resolution, for example, of 1200×600 dpi. In the figures, "t" stands for top; "m" stands for middle, and "b" stands for bottom. A center or middle pixel m3 is the pixel of interest which is processed in both the horizontal and vertical thin line enhancements.

FIG. 2A shows an exemplary basic context window 200a which may be used for horizontal thin line detection. Horizontal basic context window 200a is of a "3×3" configuration.

FIG. 2B shows an exemplary basic context window 200b which may be used for vertical thin line detection. As shown, the window 200b is of a "3×3+2" configuration, having two additional horizontal pixels m1 and m0 added to the right of the middle row of the 3×3 array of pixels. The additional two pixels m1 and m0 in the vertical basic context window 200b can be checked to avoid filling in certain voids by mistake, as discussed below.

Figure 3A:
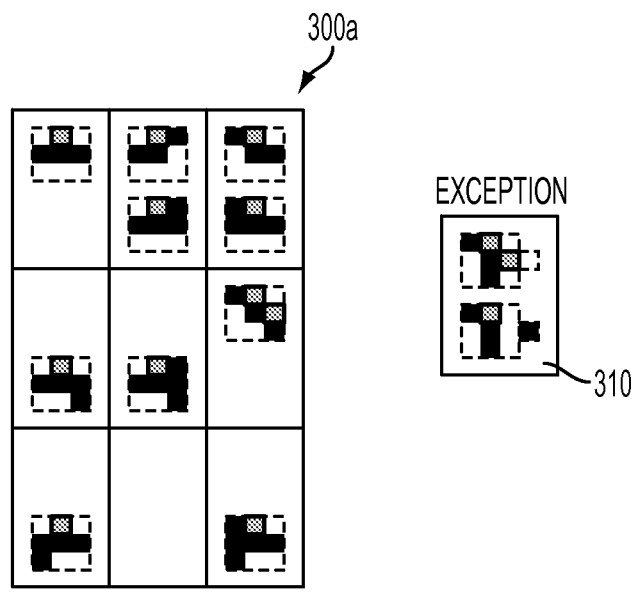
FIGS. 3A and 3B show patterns that satisfy the horizontal and vertical thin line detection logic for the context windows shown in FIGS. 2A and 2B, respectively, according to an embodiment.
Figure 3B:
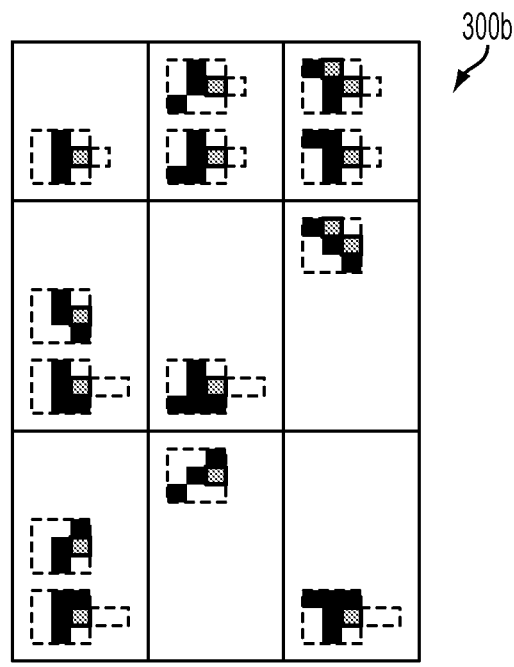

FIGS. 3A and 3B show patterns that satisfy the horizontal and vertical thin line detection logic for the basic context windows 200a and 200b shown in FIGS. 2A and 2B, respectively, according to an embodiment. The black regions are ON pixels, while white regions are OFF pixels. When such patterns are detected, the gray regions are pixels that will be added (i.e., turned ON) by the subsequent thin line enhancement processing.

FIG. 3A shows patterns 300a that satisfy the horizontal thin line detection logic. When patterns are identified which correspond to a thin horizontal line, the logic will ensure that width of the identified horizontal line is at least two pixels. For the logic operations described herein, "&" stands for an AND operation, "~" stands for a NOT operation, "^" stands for an XOR operation, and "|" stands for an OR operation.

The following basic detection logic may be used to identify the horizontal thin line patterns shown in FIG. 3A (other than the two horizontal exception scenarios shown in box 310):

(m3 &
    ~((b4 & b2)|b3) &
    ~((t4 & t2)|t3) &
    ~(t4 & b2 & m2) &
    ~(t4 & b2 & m4) &
    ~(t2 & b4) &
    ~((t2 ^ ~b2) & ~m2) &
    ~((t4 ^ ~b4) & ~m4) &
    ((b4 ^ b2) & (m4 ^ m2)))

The horizontal patterns may include one or more exception scenarios that include continuous lines. For instance, the exception cases may consider pixels outside of basic context window 200a, 200b. These may include, for instance, cases where (1) pixels may need to be added above a horizontal thin line, or (2) pixels may need to be added below the horizontal thin line.

In FIG. 3A, box 310 shows two horizontal "exception" scenarios which may be identified according to the following logic:

exception=t4 & ~t3 & ~t2 & ~m4 & ~m2 & ~b4 & b3
      & ~b2

When the exception scenario is true (e.g., value=1), pixels which are not otherwise specifically covered by the patterns 300a, might also be corrected.

While the first (top) pattern in 310 is a horizontal line by the exception rule, it may also be considered a vertical line by the vertical line detection logic to be introduced below. So a pixel will be added above the center pixel as a result of the horizontal line enhancement and another pixel will be added to the right of the center pixel as a result of the vertical line enhancement. The second (bottom) pattern in 310 is only a horizontal line by the exception rule.

Both the patterns and exception scenarios may be identified for horizontal thin line detection with the following logic operations:

(m3 & exception)|
    (m3 &
    ~((b4 & b2)|b3) &
    ~((t4 & t2)|t3) &
    ~(t4 & b2 & m2) &
    ~(t4 & b2 & m4) &
    ~(t2 & b4) &
    ~((t2 ^ ~b2) & ~m2) &
    ~((t4 ^ ~b4) & ~m4) &
    ((b4 ^ b2) & (m4 ^ m2)))

If the result of the above horizontal thin line detection logic is true (e.g., value=1), a pixel may be added to the gray pixel locations shown in the patterns 300a for applying horizontal thin line enhancement. As such, for each of the identified scenarios, an additional pixel will be added to ensure a width (in the vertical direction) of the thin line of at least two pixel.

FIG. 3B shows patterns 300b that satisfy the vertical thin line detection logic. When patterns are identified which correspond to a thin vertical line, the logic will ensure that width of the identified vertical thin line is at least two pixels.

The following basic detection logic may be used to identify the vertical thin line patterns shown in FIG. 3B:

m3 &
~((t4 & b4)|m4) &
~((t2 & b2)|m2) &
~(t4 & b2 & b3) &
~(t4 & b2 & t3) &
~(b4 & t2 & b3) &
~(b4 & t2 & t3) &
~((b4 ^ ~b2) & ~b3) &
~((t4 ^ ~t2) & ~t3) &
((m3 & ~b3 & b2)|(m3 & ~t3 & t2)|(~(m3 ^ ~m1) & ~((m3 & m0 & (t2|b2))|(~m3 & ~m0))));

When the result of the above vertical line detection logic is true (e.g., value=1), a pixel may be added to the gray pixel locations shown in the patterns 300b for applying vertical line enhancement. Thus, when such patterns are identified which correspond to a thin vertical line, the logic will ensure that width (in the horizontal direction) of the identified vertical line is at least two pixels.

The basic context windows 200a and 200b may be "moved" across the image to process each and every pixel in the image. For instance, the basic context windows may be virtually "moved" across the image left to right and top to bottom.

The logic disclosed herein can be implemented, for example, by a processor circuit having an 8-bit in/1-bit out look-up table for increased flexibility. Of course, other processors are also possible.

The basic horizontal and vertical thin line detection and enhancement scheme may be used to handle different line widths, due to images having different input resolutions. For instance, larger context windows may be "collapsed" or mapped to the smaller basic context windows for thin line detection and enhancement of higher resolution images, for instance, 2400 dpi. In general, the higher the input resolution the larger the context window needed. Also, the thicker (more pixels) the original line, a larger context window may be needed for enhancement. While a 7×5 window may be capable of handling many cases, in some instances, 7×7 window may be able to do more in growing vertical lines.

FIG. 4 shows an exemplary larger context window 400 that may be used for handling thin line detection and enhancement of input electronic images having different input resolutions according to an embodiment.

This overall detection may be performed with a 7×5 context window (although other sized windows might also be possible). In the figures, "L" stands for left, "LL" stands for further left, "C" stands for center, "R" stands for right, and "RR" stands for further right. It is noted that the pixel labeled as "x" may also be referred to as "C3."

FIGS. 5A and 5B show mapping a larger context window to a smaller basic context window in preparing for horizontal and vertical line detection and enhancement according to an embodiment.

These basic context windows 200a, 200b (FIGS. 2A and 2B) by themselves may not provide sufficient context (area) for handling images having higher resolutions. Thus, larger context windows 510a, 510b are used to provide a greater area of pixels to consider. According to an aspect, pixels in the larger context window 510a, 510b may be mapped to the smaller context window 520a, 520b. These smaller context windows 520a, 520b may correspond to the basic context windows 200a, 200b. Once populated with pixel values, the smaller context windows 520a, 520b may be processed similarly to the basic thin line detection and enhancement methodology discussed above.

FIG. 5A shows converting the larger context window pixels to the basic context window for horizontal line detection and enhancement The context window 510a is shown with the context window 400. Context window 510a is shown being of a "4×3" configuration, although it will be appreciated that other sized windows might also be possible, but less than context window 400. The smaller basic context window 520a is populated based on pixel values from the context window 510a.

A horizontalMode option may be selected to determine a mode for horizontal line growth.

In a first mode (also referred to herein as oneToTwo mode), a single pixel line can be grown by adding a pixel above the detected line. In a second mode (also referred to herein as addOne mode), both single pixel lines and double pixel lines can be grown by one pixel, for instance, by adding a pixel above the detected line. In a third mode (also referred to herein as allToThree mode), a single pixel line can be grown to a three-pixel one by adding a pixel above and below the detected line. A double-pixel line can also be grown to a three-pixel one by adding a pixel above the same detected line as in the addOne mode with double line input.

Table 1, below, shows the relationships of the three pixel growth modes and the operations to support them. While only one pixel has been described as being added above the detected line, it will be appreciated that this methodology could be extended, for example, to add a pixel below for a double-pixel line also, to further provide a fourth mode (also referred herein as a twoToFour mode).

TABLE 1

| Mode and operation for horizontal line growth | | | |
| --- | --- | --- | --- |
| | Add pixel above for single-pixel line | Add pixel above for double-pixel line | Add pixel below |
| oneToTwo | Yes | No | No |
| addOne | Yes | Yes | No |
| allToThree | Yes | Yes | Yes |

If the oneToTwo option is selected, then the following pixel mapping may be used for mapping the larger context window 510a pixels to the basic context window 520a for horizontal thin line detection:

t4=L3,
t3=x,
t2=R3,
m4=L4,
m3=C4,
m2=R4,
b4=L5,
b3=C5,
b2=R5

On the other hand, if the addOne option is selected, then the following mapping may be used:

t4=L3,
t3=x,
t2=R3,
m4=L4|L5,
m3=C4,
m2=R4|R5,
b4=L5 & L6,
b3=C5 & C6,
b2=R5 & R6

The current pixel "x" will be turned ON, if the conditions in the horizontal thin line logic are satisfied or the exception case is satisfied.

For the larger context window 400, the exception scenarios 310 shown in FIG. 3A may be identified as follows:

exception=L3 & ~C3 & ~R3 & ~L4 & ~R4 & ~L5 & C5 & ~R5

C4, which corresponds to m3, is checked separately.

The basic horizontal line detection logic discussed above may then be applied to the context window 520b as follows:

(m3 & exception)|
(m3 &
~((b4 & b2)|b3) &
~((t4 & t2)|t3) &
~(t4 & b2 & m2) &
~(t4 & b2 & m4) &
~(t2 & b4) &
~((t2 ^ ~b2) & ~m2) &
~((t4 ^ ~b4) & ~m4) &
~((b4 ^ b2) & (m4 ^ m2)));

As such, the same logic can be used for various input resolutions thereby increasing flexibility.

The following exclusion cases for thin horizontal lines may then be considered, which may disqualify the current pixel for thin line enhancement:

(a) all pixels in column LL0 and column RR0 are OFF, L0, C0, R0, L6, C6 and R6 are OFF. This excludes some small, isolated segments of connected pixels which could be partial halftone dots. This condition is shared between horizontal line and vertical line cases.

(b) L2, L3 and L4 are all ON.
(c) R2, R3 and R4 are all ON.
(d) L4, L5 and L6 are all ON.
(e) R4, R5 and R6 are all ON.

The foregoing cases (b)-(e) may be excluded simply because when these pixels are ON, the patterns do not appear like a horizontal line.

(f) in some implementations, the horizontal line may be selected to be denser (i.e., greater than one pixel in width). This is to prevent a sudden change in line spacing if the line density feature is not selected and C2 is ON. This is to optionally avoid filling in void in dense line areas. In some cases the gap between thin lines is as small as one or two pixels. Growing the line may fill the void. On the other hand, in some cases such as when the lines are converging (or the gap becomes smaller as the lines extend), to stop growing the lines at a certain point (or gap size) may cause the appearance of an abrupt change. So the flag noDenseLine is introduced to give the user the option to grow or not to grow in these regions. If the noDenseLine is being used, then the ON status of C2 will prevent the growth for the current pixel under consideration.

(g) if the addOne mode is selected, then the following exclusion conditions may also apply. It is noted that the addOne mode will be used for resolutions higher than 1200× 1200, which may require more checking for possible halftone patterns:

(i) The option moreExclusion is ON, LL1, L1, L2, L3, R4 are all ON.
(ii) The option moreExclusion is ON, LL3, L3, C5, C6 and R6 are all ON.
(iii) L4, C5 and L6 are all ON, L5 is OFF.
(iv) R4, C5 and R6 are all ON, R5 is OFF.

Patterns (g) (i) and (g) (ii) are cases in which the patterns are more likely from a halftone (when combined with the pattern specified by the "normal" horizontal line condition). The exclusions are applied when horizontalMode is addOne or all To Three. These exclusions may not be applied for horizontalMode of oneToTwo because in the mode the "normal" horizontal line condition requires that C5 is OFF, making the pattern less likely a halftone pattern. Similarly, the patterns in (g) (iii) and (g) (iv) are the ones less likely to be from a horizontal line.

The context preparation for larger resolution thin vertical line detection and enhancement will be discussed.

FIG. 5B shows mapping the larger context window pixels to the basic context window for vertical line detection and enhancement.

The context window 510b is depicted with the context window 400. Context window 510b is shown being in a "3×3+2" configuration, although it will be appreciated that other larger sized windows are also possible, but less than context window 400. The smaller basic context window 520b is populated based on pixel values from the larger context window 510b.

The basic vertical thin line detection logic may be applied to the smaller basic vertical context window 510b as follows:

m3 &
~((t4 & b4)|m4) &
~((t2 & b2)|m2) &
~(t4 & b2 & b3) &
~(t4 & b2 & t3) &
~(b4 & t2 & b3) &
~(b4 & t2 & t3) &
~((b4 ^ ~b2) & ~b3) &
~((t4 ^ ~t2) & ~t3) &
((m3 & ~b3 & b2)|(m3 & ~t3 & t2)|(~(m3 ^ ~m1) & ~((m3 & m0 & (t2|b2))|(~m3 & ~m0))));

The following exclusion cases for thin vertical lines may then be considered, which may disqualify the current pixel for enhancement:

(a) All pixels in column LL0 and column RR0 are OFF, L0, C0, R0, L6, C6 and R6 are OFF. It is noted that this condition is shared between all horizontal line cases and the vertical line case.

The initialExclusion/more Exclusion options, mentioned below, can be used to prevent improper detections (i.e., false alarms) in detecting thin line in halftone area. The more exclusion options, however, might also mean more risk of missing real thin lines. Having several stages of such exclusion allows for more control. It is also related to different input resolutions. The initialExclusion option may be used for a first (lower) resolution, and the moreExclusion option may be used for a second and/or subsequent (higher) resolutions.

(b) The option initialExclusion is ON and any one of the patterns shown in FIGS. 6A-6H is present. That said, the gray shaded pixels must be ON (i.e., L3 is always ON when the condition checking is used). As previously mentioned, the presence of any of these patterns indicates that the area is more likely an halftone area and less likely a thin line area.

(c) The option moreExclusion is ON and any one of the patterns shown in FIG. 7A-H is present. That is because these could be part of some halftone patterns.

(d) The option moreExclusion is ON, LL5, L5 and C5 are OFF, L2 and L4 are ON.

(e) The option moreExclusion is ON, LL1, L1 and C1 are OFF, L2 and L4 are ON.

Cases (a)-(e) may be excluded because they resemble more of a halftone pattern and less of a vertical line.

The methodology has shown to be effective in enhancing thin lines in high resolution input bitmaps without introducing artifacts. While the above description details a double-pixel horizontal scenario, it may be extended to cover a double-pixel vertical line case.

Figure 8A:
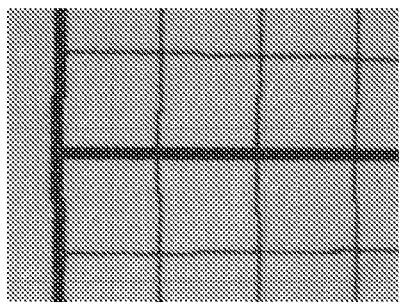
FIGS. 8A-8C show photographs illustrating the results of thin line enhancement according to embodiments.
Figure 8B:
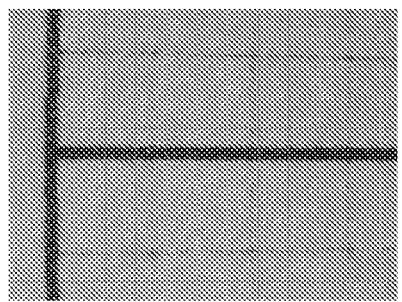
Figure 8C:
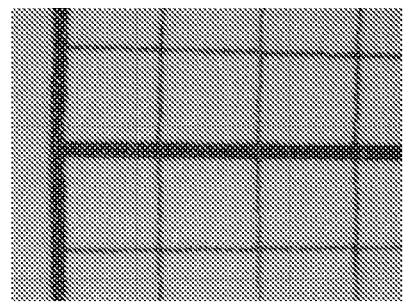

FIGS. 8A-8C show photographs illustrating the results of thin line enhancement, according to embodiments. The photographs have been magnified for clarity.

FIG. 8A shows a photograph of printing a grid image 800a in 600×600 dpi without thin line enhancement. Grid image 800a may be composed of a plurality of thin horizontal and vertical lines. As shown, the thin horizontal and vertical lines may have a "stair-stepped" appearance. This printing may be unpleasing, as the grid image 800a was intended to have straight lines (e.g., whether horizontal, vertical or angled).

FIG. 8B shows a photograph of printing a grid image 800b in 1200×1200 dpi without thin line enhancement. As shown, the thin horizontal and vertical lines may appear unfocused and not clear.

FIG. 8C shows a photograph of printing a grid image 800c in 1200×1200 dpi in which thin line detection and enhancement had been applied according to an embodiment. As shown, the thin horizontal and vertical lines after enhancement appear much clearer and in focus as compared with the similar features in FIG. 8B without thin line enhancement. The embodiment fixes the thin line imaging problem while retaining the benefits of high resolution printing.

The above methodology either grows a single pixel line by one pixel or grows both single pixel and double pixel lines by one pixel. For some marking engines, though, it may be desirable to also have the option of making a one-pixel line appear larger and more pronounced.

Thus, in some embodiments, the thin line may be grown to a three-pixel width line or larger. Thus, according to a further aspect of this disclosure, the thin line detection and enhancement methodology may enable the option of turning a one-pixel line into a larger pixel width line. For example, a 3-pixel width thin line may be developed within the framework used in performing the one-pixel to two-pixel growth and the two-pixel to three-pixel growth operations. While the one-to-two-pixel and two-to-three-pixel growth embodiments add a pixel above the detected line, the extra growth needed for the one-to-three conversion may be performed by turning on the current pixel of interest when a line is detected above it.

Figures 9, 9A, 10:
FIG. 9 shows the context window for a thin line detection/enhancement growth algorithm in accordance with an embodiment.
FIG. 9A shows use of a noDenseLine option according to an embodiment.
FIG. 10 shows converting the larger context window to the smaller basic context window in preparing for thin line detection/enhancement growth algorithm in accordance with embodiments.

FIG. 9 shows the context window 900 for a thin line detection/enhancement growth algorithm in accordance with an embodiment. This context window 900 may be similar to context window 400 (FIG. 4). The pixel labeled as "x" may sometimes also be referred to as "C3."

FIG. 10 shows mapping the larger context window 1010 to the smaller basic context window 1020 in preparing for horizontal line detection and enhancement in accordance with embodiments. The following mapping may be used for this purpose:

t4=L1,
t3=C1,
t2=R1,
m4=L2|L3,
m3=C2,
m2=R2|R3,
b4=L4,
b3=C4,
b2=R4

In particular, this mapping may used for adding a pixel below the line. The horizontal exception in this embodiment, which is also called the second exception in order to distinguish it from the first exception in 310, may be computed as follows:

exception=moreAddition & ~C0 & C1 & ~C5 &
((~R1 & ~RR1 & ~LL3 & ~L3 & R3 & ~R5)|
(~L1 & ~LL1 & ~RR3 & ~R3 & L3 & ~L5))

where C2, which corresponds to m3, is checked separately.

FIGS. 10A and 10B shows two exception patterns 1010a, 1010b which are identified with the aforementioned logic.

According to the "normal" horizontal line conditions shown in FIG. 3A, pixel x will not be turned ON. Yet, with the above logic, pixel x will be turned ON. Pixels, in some instances, may also be added below the detected line. For example, the exception pattern 1010b shown in FIG. 10B is not considered as an absolute need in growing the line into a 3-pixel one (i.e., in, allToThree mode) but could make the line smoother. Thus, having the moreAddition option provides the ability to enable/disable this exception This may make the line smoother, although, it can in some instances make the line appear thicker). Also, it may be desired to grow horizontal lines only, instead of vertical ones. These factors may depend on user preference, as well as marking engine characteristics. Thus, the moreAddition option permits the second exception to be selectively enabled/disabled for this purpose.

The following horizontal thin line detection logic may then be applied in an analogous manner as described above:

(m3 & exception)|
(m3 &
~((b4 & b2)|b3) &
~((t4 & t2)|t3) &
~(t4 & b2 & m2) &
~(t4 & b2 & m4) &
~(t2 & b4) &
~((t2 ^ ~b2) & ~m2) &
~((t4 ^ ~b4) & ~m4) &
~((b4 ^ b2) & (m4 ^ m2)));

And, the following conditions may then disqualify the current pixel for horizontal thin line enhancement:

(a) All pixels in column LL0 and column RR0 are OFF, L0, C0, R0, L6, C6 and R6 are off. This is to exclude some small, isolated segments of connected pixels which could be partial halftone dots.

(b) L0, L1 and L2 are all ON
(c) R0, R1 and R2 are all ON
(d) L2, L3 and L4 are all ON
(e) R2, R3 and R4 are all ON
(f) noDenseLine is ON and also either C4 or C5 is ON. This may be optional to avoid filling in void in dense line areas. The noDenseLine option enables very dense horizontal lines to be grown (i.e, up to one-ON/one-OFF, meaning alternating black and white lines). That being said, this is similar to the noDenseLine description earlier. In addOne or oneToTwo modes, pixel(s) are added above the line, so as to check the location one more pixels above the current pixel of interest. allToThree means pixels may be added below (for one-pixel wide lines to check the pixel below the current pixel of interest (if it is ON, then do not turn ON the current pixel otherwise a void may be filled. The reason for checking both pixels C4 and C5 is that by the time this part of the function is invoked, a pixel would have been added above the current pixel of interest. Looking at the original bitmap two pixels are looked at. Of course, when the noDenseLine flag is OFF, pixels are grown without looking at pixels C4 or C5. This may depend on user preference. If pixels are not grown in dense areas, there may be a sudden change if the line spacing in the original changes gradually. As such, it may be necessary to fill in any such voids. The noDenseLine option provides such control.

FIG. 9A shows use of the noDenseLine option according to an embodiment. For instance, if noDenseLine option is OFF then the pixel of interest (labeled "x") in context window 910a will be turned ON. On the other hand, if noDenseLine option is turned ON, then the pixel x will not be turned ON.

Cases (a)-(f) may be patterns which are more likely to be halftone patterns.

Although the description above is for adding an extra pixel to horizontal lines, it will be appreciated that the methodology can be extended to similarly handle vertical lines as well.

FIGS. 11A and 11B show the images with and without thin line growth respectively, according to embodiments.

FIG. 11A shows the original bitmap image 1100a without thin line growth enhancement. FIG. 11B shows the image 1100b after having thin line growth enhancement. As shown, the one-pixel width lines shown in FIG. 11A have been converted to three-pixel width lines. Accordingly, the enhanced image 1100b appears sharper than the original image 1100a, with thin lines being more pronounced.

While this disclosure has been described in connection with what is presently considered to be the most practical and preferred embodiments, it is to be understood that it is capable of further modifications and is not to be limited to the disclosed embodiments, and this disclosure is intended to cover any variations, uses, equivalent arrangements or adaptations of the inventive concepts following, in general, the principles of the disclosed embodiments and including such departures from the present disclosure as come within known or customary practice in the art to which the embodiments pertains, and as may be applied to the essential features hereinbefore set forth and followed in the spirit and scope of the appended claims.

What is claimed is:

1. A method for thin line detection and enhancement of electronic images comprising:
    associating an electronic image with at least one basic context window that is less than the size of the electronic image based on the input image resolution of the electronic image, wherein the at least one basic context window is configured to enable thin line detection in electronic images having different input image resolutions;
    detecting one or more predefined patterns which correspond to thin lines in the electronic image using the at least one basic context window, wherein the predefined patterns include horizontal thin line patterns and vertical thin line patterns;
    excluding patterns for the one or more detected patterns which are halftone patterns; and
    adding at least one pixel to the electronic image based on at least one of the remaining patterns so as to enhance thin line features in the electronic image.

2. The method according to claim 1, wherein the input resolution of the electronic image is 600, 1200, 2400 dpi or combinations thereof.

3. The method according to claim 1, wherein associating the electronic image with the at least one basic context window comprises:
    populating pixel values from the electronic image into the at least one basic context window for detecting the one or more predefined patterns which correspond to thin lines in the electronic image.

4. The method according to claim 1, wherein associating the electronic image with the at least one basic context window comprises:
    populating pixel values from the electronic image into at least one other context window larger than the at least one basic context window; and
    mapping the at least one other context window to the at least one basic context window for detecting the one or more predefined patterns which correspond to thin lines in the electronic image.

5. The method according to claim 1, wherein at least one electronic image has a first resolution and another electronic image has a second different resolution.

6. The method according to claim 5, wherein associating the electronic image with the at least one basic context window comprises:
    (i) for an electronic image of the first resolution, populating pixel values from the electronic image into the at least one basic context window for detecting the one or more predefined patterns which correspond to thin lines in the electronic image; and
    (ii) for an electronic image of the second resolution, populating pixel values from the electronic image into at least one other context window larger than the at least one basic context window; and mapping the at least one other context window to the at least one basic context window for, detecting the one or more predefined patterns which correspond to thin lines in the electronic image.

7. The method according to claim 1, wherein the thin line includes one or more of horizontal, vertical, or slated thin lines.

8. The method according to claim 1, wherein the at least one pixel added is one pixel.

9. The method according to claim 1, wherein the at least one pixel added is two or three pixels.

10. The method according to claim 1, wherein the at least one pixel is added above, below, or both above and below the detected thin line.

11. The method according to claim 1, wherein the at least one, basic context window comprises a basic horizontal thin line detection context window and a basic vertical thin line detection context window.

12. The method according to claim 1, wherein the at least one context window is used to process each and every pixel of the electronic image.

13. A system for thin line enhancement in electronic images comprising:
    an image processor configured to:
        associate an electronic image with at least one basic context window that is less than the size of the electronic image based on the input image resolution of the electronic image, wherein the at least one basic context window is configured to enable thin line detection in electronic images having different input image resolutions;
        detect one or more predefined patterns which correspond to thin lines in the electronic image using the at least one basic context window, wherein the predefined patterns include horizontal thin line patterns and vertical thin line patterns;
        exclude patterns for the one or more detected patterns which are halftone patterns; and
        add at least one pixel to the electronic image based on at least one of the remaining patterns so as to enhance thin line features in the electronic image.

14. The system according to claim 13, wherein the input resolution of the electronic image is 600, 1200, 2400 dpi or combinations thereof.

15. The system according to claim 13, wherein, in associating the electronic image with the at least one basic context window, the image processor is configured to:
    populate pixel values from the electronic image into the at least one basic context window for detecting the one of more predefined patterns which correspond to thin lines in the electronic image.

16. The system according to claim 13, wherein, in associating the electronic image with the at least one basic context window, the image processor is configured to:
  populate pixel values from the electronic image into at least one other context window larger than the at least one basic context window; and
  map the at least one other context window to the at least one basic context window for detecting the one or more predefined patterns which correspond to thin lines in the electronic image.

17. The system according to claim 13, wherein at least one electronic image has a first resolution and another electronic image has a second different resolution.

18. The system according to claim 17, wherein, in associating the electronic image with the at least one basic context window, the image processor is configured to:
  (i) for an electronic image of the first resolution, populate pixel values from the electronic image into the at least one basic context window for detecting the one or more predefined patterns which correspond to thin lines in the electronic image; and
  (ii) for an electronic image of the second resolution, populate pixel values from the electronic image into at least one other context window larger than the at least one basic context window; and map the at least one other context window to the at least one basic context window for detecting the one or more predefined patterns which correspond to thin lines in the electronic image.

19. The system according to claim 13, wherein the thin line includes one or more of horizontal, vertical, or slated thin lines.

20. The system according to claim 13, wherein the at least one pixel added is one pixel.

21. The system according to claim 13, wherein the at least one pixel added is two or three pixels.

22. The system according to claim 13, wherein the at least one pixel is added above, below, or both above and below the detected thin line.

23. The system according to claim 13, wherein the at least one basic context window comprises a basic horizontal thin line detection context window and a basic vertical thin line detection context window.

24. The system according to claim 13, wherein the at least one context window is used to process each and every pixel of the electronic image.

25. The system according to claim 13, wherein the image processor is configured to handle different line widths due to the electronic images having different input image resolutions.

26. The system according to claim 13, wherein the different input image resolutions include 600, 1200 and 2400 dots-per-inch (dpi) and combinations thereof in both horizontal and vertical directions.

* * * * *